(12) United States Patent
Burkard et al.

(10) Patent No.: US 8,793,235 B2
(45) Date of Patent: Jul. 29, 2014

(54) SYSTEM AND METHOD FOR IMPROVING ACCESS TO SEARCH RESULTS

(75) Inventors: Timo Burkard, San Francisco, CA (US); Ziga Mahkovec, San Francisco, CA (US); Christopher Bentzel, Quincy, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/353,626

(22) Filed: Jan. 19, 2012

(65) Prior Publication Data

US 2013/0191360 A1    Jul. 25, 2013

(51) Int. Cl.
G06F 7/00     (2006.01)
G06F 17/30    (2006.01)

(52) U.S. Cl.
USPC .......................................................... 707/705

(58) Field of Classification Search
USPC .......................................................... 707/705
See application file for complete search history.

(56) References Cited

U.S. PATENT DOCUMENTS

| | | | |
|---|---|---|---|
| 5,715,445 A | 2/1998 | Wolfe |
| 5,946,682 A | 8/1999 | Wolfe |
| 6,055,569 A | 4/2000 | O'Brien et al. |
| 6,100,871 A | 8/2000 | Min |
| 6,151,603 A | 11/2000 | Wolfe |
| 6,182,133 B1 | 1/2001 | Horvitz |
| 6,301,576 B1 | 10/2001 | Wolfe |
| 6,604,103 B1 | 8/2003 | Wolfe |
| 6,976,090 B2 | 12/2005 | Ben-Shaul et al. |
| 7,047,502 B2 | 5/2006 | Petropoulos et al. |
| 7,103,594 B1 | 9/2006 | Wolfe |
| 7,155,336 B2 | 12/2006 | Dorfman et al. |
| 7,277,924 B1 | 10/2007 | Wichmann et al. |
| 7,428,701 B1 | 9/2008 | Gavin et al. |
| 7,467,137 B1 | 12/2008 | Wolfe |
| 7,487,147 B2 | 2/2009 | Bates et al. |
| 7,536,635 B2 | 5/2009 | Racovolis et al. |
| 7,716,332 B1 | 5/2010 | Topfl et al. |

(Continued)

FOREIGN PATENT DOCUMENTS

| | | |
|---|---|---|
| KR | 20080111822 | 12/2008 |
| KR | 20100112512 | 10/2010 |

OTHER PUBLICATIONS

Fisher, Darin, "Link Prefetching FAQ," dated Mar. 3, 2003, published by Mozilla Developer Network (MDN), from https://developer.mozilla.org/en/Link_prefetching_FAQ (2003).
U.S. Appl. No. 13/175,067, filed Jul. 1, 2011.

(Continued)

*Primary Examiner* — Kuen Lu
(74) *Attorney, Agent, or Firm* — Lerner, David, Littenberg, Krumholz & Mentlik, LLP

(57) ABSTRACT

Aspects of the disclosure provide a system and method for prerendering of search result pages. A search engine may process search queries received from a client. The search engine may determine one or more search results in response to the search query. One or more of the search results may be associated with prerender instructions, such that when the search results are received by the client, the client prerenders the search results associated with the prerender instructions. Prerender instructions may be associated with the search results in various manners, including ranking the search results based on relevance, or ranking the search results based on the likelihood of selection. Metrics and analytical data may be collected from the client to improve the search result prerendering process.

23 Claims, 10 Drawing Sheets

(56) References Cited

U.S. PATENT DOCUMENTS

| | | | |
|---|---|---|---|
| 7,747,749 B1 | 6/2010 | Erikson et al. | |
| 7,802,305 B1 | 9/2010 | Leeds | |
| 7,805,673 B2 | 9/2010 | der Quaeler et al. | |
| 7,840,589 B1 | 11/2010 | Holt et al. | |
| 7,876,335 B1 | 1/2011 | Pittenger et al. | |
| 7,908,336 B2 | 3/2011 | Carlson et al. | |
| 8,112,308 B1 | 2/2012 | Ho et al. | |
| 8,260,938 B2 | 9/2012 | Gupta et al. | |
| 8,504,907 B2 | 8/2013 | Piersol | |
| 2002/0075333 A1 | 6/2002 | Dutta et al. | |
| 2003/0061451 A1 | 3/2003 | Beyda | |
| 2003/0088580 A1 | 5/2003 | Desai et al. | |
| 2003/0212760 A1 | 11/2003 | Chen et al. | |
| 2004/0267600 A1 | 12/2004 | Horvitz | |
| 2004/0268228 A1 | 12/2004 | Croney et al. | |
| 2005/0132296 A1 | 6/2005 | Milic-Frayling et al. | |
| 2005/0240576 A1 | 10/2005 | Piscitello et al. | |
| 2005/0251396 A1 | 11/2005 | Tyler | |
| 2006/0047804 A1 | 3/2006 | Fredricksen et al. | |
| 2006/0143568 A1 | 6/2006 | Milener et al. | |
| 2007/0005425 A1 | 1/2007 | Bennett et al. | |
| 2007/0198634 A1 | 8/2007 | Knowles et al. | |
| 2007/0220010 A1* | 9/2007 | Ertugrul | 707/10 |
| 2007/0226633 A1 | 9/2007 | Lyle et al. | |
| 2007/0288648 A1 | 12/2007 | Mehanna et al. | |
| 2008/0052219 A1 | 2/2008 | Sandholm et al. | |
| 2008/0104407 A1 | 5/2008 | Horne et al. | |
| 2008/0140941 A1 | 6/2008 | Dasgupta et al. | |
| 2008/0201332 A1 | 8/2008 | Souders et al. | |
| 2008/0208789 A1 | 8/2008 | Almog | |
| 2008/0249969 A1 | 10/2008 | Tsui et al. | |
| 2009/0013006 A1 | 1/2009 | Friedl et al. | |
| 2009/0094196 A1 | 4/2009 | Piwowarski et al. | |
| 2009/0132949 A1 | 5/2009 | Bosarge | |
| 2009/0158221 A1 | 6/2009 | Nielsen et al. | |
| 2009/0171930 A1 | 7/2009 | Vaughan et al. | |
| 2009/0216639 A1 | 8/2009 | Kapczynski et al. | |
| 2009/0265774 A1 | 10/2009 | Malik et al. | |
| 2010/0005061 A1* | 1/2010 | Basco et al. | 707/3 |
| 2010/0023581 A1 | 1/2010 | Lahav | |
| 2010/0031366 A1 | 2/2010 | Knight et al. | |
| 2010/0107115 A1 | 4/2010 | Sareen et al. | |
| 2010/0131902 A1 | 5/2010 | Teran et al. | |
| 2010/0191856 A1 | 7/2010 | Gupta et al. | |
| 2010/0251116 A1 | 9/2010 | Rimas-Ribikauskas et al. | |
| 2011/0029518 A1 | 2/2011 | Tong | |
| 2011/0029670 A1 | 2/2011 | Klein et al. | |
| 2011/0119361 A1 | 5/2011 | Issa et al. | |
| 2011/0173569 A1 | 7/2011 | Howes et al. | |
| 2011/0199304 A1 | 8/2011 | Walley et al. | |
| 2011/0289317 A1 | 11/2011 | Darapu et al. | |
| 2012/0254721 A1 | 10/2012 | Jain et al. | |
| 2012/0254727 A1 | 10/2012 | Jain et al. | |
| 2012/0324043 A1 | 12/2012 | Burkard et al. | |

OTHER PUBLICATIONS

U.S. Appl. No. 13/100,615, filed May 4, 2011.
U.S. Appl. No. 13/175,115, filed Jul. 1, 2011.
U.S. Appl. No. 13/174,925, filed Jul. 1, 2011.
U.S. Appl. No. 13/174,928, filed Jul. 1, 2011.
U.S. Appl. No. 13/182,920, filed Jul. 14, 2011.
U.S. Appl. No. 13/183,824, filed Jul. 15, 2011.
U.S. Appl. No. 13/268,279, filed Oct. 7, 2011.
U.S. Appl. No. 13/472,019, filed May 15, 2012.
U.S. Appl. No. 13/233,314, filed Sep. 15, 2011.
U.S. Appl. No. 13/233,300, filed Sep. 15, 2011.
U.S. Appl. No. 13/308,757, filed Dec. 1, 2011.
Christopher Schmitt, "CSS Cookbook, Third Edition," O'Reilly Media, Dec. 24, 2009, pp. 1, 33, 35 and 217-219.
Venoila et al. "T-Cube: A Fast, Self-Disclosing Pen-Based Alphabet". Copyright Date 1994.
Guimbretiere et al. "FlowMenu: Combining Command, Text, and Data Entry". Copyright 2000.
U.S. Appl. No. 13/353,626, filed Jan. 19, 2012.
International Search Report dated Nov. 28, 2012, in International Application No. PCT/US2012/036519.
International Search Report and Written Opinion dated Dec. 14, 2012 for PCT application US2012044896.
StackOverflow.com, "Detect if Browser Tab Has Focus," Sep. 2011, 2 pages.
International Search Report & Written Opinion dated May 7, 2013 for Application No. PCT/US2013/021927.

* cited by examiner

SYSTEM AND METHOD FOR IMPROVING ACCESS TO SEARCH RESULTS

BACKGROUND

The advent of the World Wide Web has placed more information at the fingertips of today's users than ever before. Various websites cater to nearly every need and interest, providing access to reference information, business and financial documents, social networking, and more. Widespread broadband Internet access provides faster access to these sites than ever before.

However, as fast as current high-speed Internet services are, the act of browsing the web is not instantaneous. When a user selects a link on a page or enters a uniform resource locator (URL) in a text field, there is a delay while data is requested from the host, sent to the client, and rendered in the browser. The user is typically idle while waiting for their requested site to load. While high-speed Internet access may limit this delay to a few seconds, even this short delay can add up to thousands of man-hours of lost productivity each year.

SUMMARY

Aspects of the disclosure provide a system and method for prerendering of search result pages. An Internet search engine may process search queries received from a client. The Internet search engine may determine one or more search results in response to the search query. One or more of the search results may be associated with prerender instructions, such that when the search results are received by the client, the client prerenders the search results associated with the prerender instructions. Prerender instructions may be associated with the search results in various manners, including ranking the search results based on relevance, or ranking the search results based on the likelihood of selection. Metrics and analytical data may be collected from the client to improve the search result prerendering process. For example, statistics associated with whether or not a user selected a link that was associated with a prerender instruction may be captured to improve prerender predictions.

Metrics and analytical data may be captured via a process that requires the user to "opt-in" to providing said metrics and analytical data. The system and method may provide privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not) revealed. A user may also be provided with an opportunity to opt in/out to enable the collection and sharing of data.

Aspects of the disclosure describe a computer-implemented method for prerendering using a search result page. The method may include determining, using a processor, at least one search result responsive to a search query, generating a search result page comprising the at least one search result, identifying at least one prerender candidate among the at least one search result, the at least one prerender candidate indicating a search result that is likely to be selected, embedding prerender instructions for the at least one prerender candidate in the search result page, and providing the search result page to a client device that provided the search query. The at least one prerender candidate may be identified using at least one signal, wherein the at least one signal is a frequency with which the search result is selected, an amount of traffic flowing from the search engine to the search result, a location of the client device, or a size of one or more resources associated with the search result. The prerender instructions may be embedded within a hypertext markup language tag associated with the at least one search result. The prerender instructions may be provided to the client device via client side scripting. The method may further include receiving metrics from the client device indicating whether the prerender candidate was selected when displayed, and using the metrics to identify future prerender candidates in response to subsequent search queries. The metrics may be at least one of whether a selected link was prerendered or a load time of the selected link. The method may further include embedding an experiment identifier in the search result page, the experiment identifier corresponding to a particular method used to identify the at least one prerender candidate, using one or more redirection operations associated with the search result page to identify the experiment identifier associated with a selection operation and whether the at least one prerender candidate was selected.

Aspects of the disclosure also describe a computer-implemented method for prerendering using a search result page. The method may include sending a search query to a search engine, receiving a set of search results responsive to the search query, the set of search results comprising at least one prerender instruction indicating at least one of the search results is a candidate for prerendering, identifying the at least one prerender instruction, and prerendering the at least one search result associated with the at least one prerender instruction. The method may further include monitoring for a selection operation performed on a selected search result from the set of search results, and swapping the at least one search result into an active browser instance if the selected search result is the at least one search result. The method may include storing metrics associated with a selection of a selected search result from the set of search result, and transmitting the metrics to provide statistical data to improve selection of prerendering candidates in response to subsequent search queries. The metrics may be at least one of the selected search result, whether the selected search result is the at least one search result, and a page load time to access the selected search result. The method may further include executing the prerender instruction to insert a prerender tag into a hyperlink associated with at least one search result. The metrics may further include an experiment identifier embedded in the set of search results, the experiment identifier indicating a methodology for choosing the at least one of the search results as a candidate for prerendering.

Aspects of the disclosure may provide a non-transitory computer readable storage medium comprising instructions. When executed by a processor, the instructions may perform a method including sending a search query to a search engine, receiving a set of search results responsive to the search query, the set of search results comprising at least one prerender instruction indicating at least one of the search results is a candidate for prerendering, identifying the at least one prerender instruction, and prerendering the at least one search result associated with the at least one prerender instruction. The instructions may include monitoring for a selection operation performed, on a selected search result from the set of search results, and swapping the at least one search result into an active browser instance if the selected search result is the at least one search result. The instructions may include storing metrics associated with a selection of a selected search result from the set of search result, and transmitting the metrics to provide statistical data to improve selection of prerendering candidates in response to subsequent search queries. The metrics may be at least one of the selected search result, whether the selected search result is the at least one search result, and a page load time to access the selected search result. The metrics may further include an experiment identifier embedded in the set of search results, the experiment identifier indicating a methodology for choosing the at least one of the search results as a candidate for prerendering.

Aspects of the disclosure may provide a processing system for prerendering using a search result page. The processing system may include a memory coupled to at least one processor, and the at least one processor. The processor may be configured to determine at least one search result responsive to a search query, generate the search result page, the search result page comprising the at least one search result, identify at least one prerender candidate among the at least one search result, the at least one prerender candidate indicating a search result that is likely to be selected, embed prerender instructions for the at least one prerender candidate in the search result page, and provide the search result page to a client device that provided the search query. The at least one prerender candidate may be identified using at least one signal, wherein the at least one signal is a frequency with which the search result is selected, an amount of traffic flowing from the search engine to the search result, a location of the client device, or a size of one or more resources associated with the search result. The prerender instructions may be embedded within a hypertext markup language tag associated with the at least one search result. The prerender instructions may be provided to the client device via client side scripting. The processor may be further configured to receive metrics from the client device indicating whether the prerender candidate was selected when displayed, and use the metrics to identify future prerender candidates in response to subsequent search queries. The metrics may be at least one of whether a selected link was prerendered or a load time of the selected link. The processor may be further configured to embed an experiment identifier in the search result page, the experiment identifier corresponding to a particular method used to identify the at least one prerender candidate and use one or more redirection operations associated with the search result page to identify the experiment identifier associated with a selection operation and whether the at least one prerender candidate was selected.

DETAILED DESCRIPTION

Figure 1:
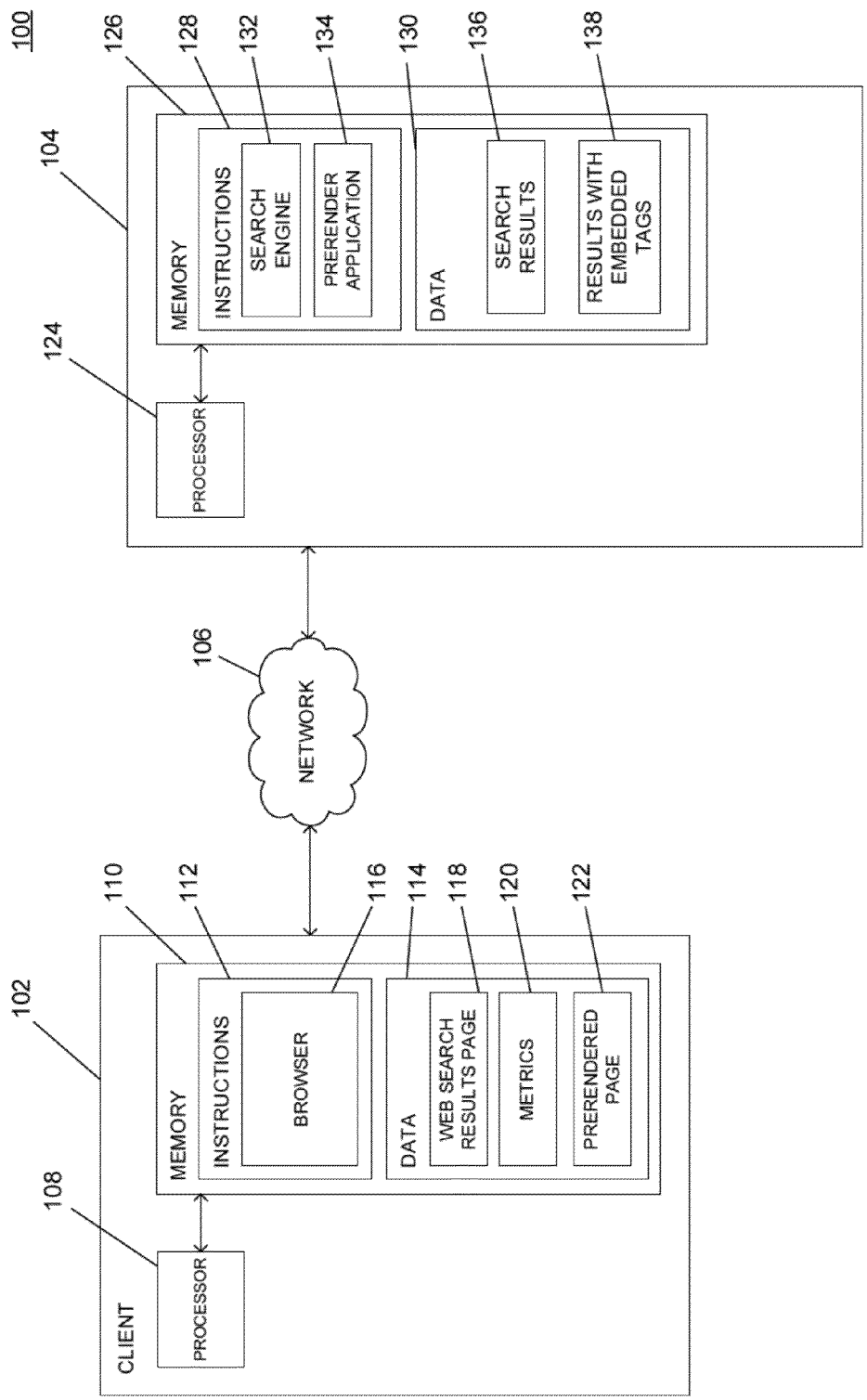
FIG. 1 is a system diagram depicting an example of a search system providing prerendering in accordance with aspects of the disclosure.

The aspects, features and advantages of the present disclosure will be appreciated when considered with reference to the following description of preferred embodiments and accompanying figures. The following description does not limit the disclosure; rather, the scope is defined by the appended claims and equivalents.

While certain processes in accordance with example embodiments are shown in the figures as occurring in a linear fashion, this is not a requirement unless expressly stated herein. Different processes may be performed in a different order or concurrently.

The disclosure describes systems and methods for providing search results pages with prerender instructions. Aspects of the disclosure minimize the delay between a user's selection of a navigation event (e.g., clicking on a search result hyperlink) and display of the content associated with the navigation event by prerendering content associated with the navigation event prior to the user's selection of the event. For example, the method and system may predict a likely next uniform resource locator during web browsing to preemptively request content from the network before the user selects the corresponding link, thus minimizing the wait time when a user selects a hyperlink on a web page. Various methods for performing the prerendering operation, configuring the prerendering operation, and managing the prerendering operation are described. For the purposes of this application, the term "prerendering" generally refers to the act of requesting resources (e.g., any executable code, scripting language, files, and/or interactive objects) necessary to load the content of a web address, and loading the content in a web browser instance. Prerendering includes the process of rendering a page, including interpreting scripts, laying out the page and rendering it in an invisible browser instance.

When a user performs a search query in a browser using an Internet search engine, the Internet search engine may flag one or more of the search results provided in response to the search query with prerender instructions. These prerender instructions may be embedded within the web page itself (e.g., via hypertext markup language (HTML) tags in the page source), or indicated to the browser in another manner, such as via asynchronous JAVASCRIPT (AJAX). Although various exemplary embodiments are discussed with respect to a web browser, the term browser may be construed broadly to also include any application that fetches content using Internet addresses. For example, the browser may be an application executing on a smartphone, a web browser displaying an Internet search engine executing on a laptop or desktop computer, a search toolbar integrated within a web browser, a search application included in a computer operating system, or the like.

High traffic sites such as Internet search engines may have unique problems with prerendering. For example, if a search engine mislabels a search result for a popular search query as a good prerender candidate, but users do not frequently choose that search result, then the web server hosting the mislabeled search result will experience additional traffic without additional page views. This may result in wasted bandwidth for the hosting page, and wasted system resources for the user's computer, as the prerendered page is downloaded over the network and executed in a hidden browser instance. As such, it is desirable to monitor system metrics for use in improving the selection of links to associate with prerendering operations. Aspects of the system and method may provide these metric monitoring functions using data provided by clients that opt-in to voluntary data gathering for the purpose of improving the prerendering experience.

FIG. 1 presents a schematic diagram of a computer system depicting various computing devices that can be used alone or in a networked configuration in accordance with aspects of the disclosure. For example, this figure illustrates a computer network 100 with a client device 102, and a server 104, in communication via a network 106. The client device 102 allows a user to submit a search query to initiate a search operation using the search query. The server 104 receives the search query and performs the search operation using search query. The server 104 may also associate one or more prerender instructions with search results provided to the user in response to the search query.

The client device 102 may be a computing device as known in the art. For example, the client device 102 may be a laptop computer, a desktop computer, a netbook, a rack-mounted server, a smartphone, a cellular phone, or any other device containing programmable hardware or software for executing instructions. The computing device 102 may include a processor 108, a memory 110 and other components typically present in general purpose computers. The memory 110 may store instructions 112 and data 114 that are accessible by the processor 108. The processor 108 may execute the instructions 112 and access the data 114 to control the operations of the client device 102.

The processor 108 may be any suitable processor, such as various commercially available general purpose processors. Alternatively, the processor 108 may be a dedicated controller such as an application-specific integrated circuit ("ASIC") or a field-programmable gate array ("FPGA").

The memory 110 may be any type of tangible memory operative to store information accessible by the processor 108, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

Although FIG. 1 functionally illustrates the processor 108 and memory 110 as each being within a single block respectively, it should be understood that the processor 108 and memory 110 may actually comprise multiple processors and memories that may or may not be stored within the same physical housing. Accordingly, references to a processor, computer or memory will be understood to include references to a collection of processors, computers or memories that may or may not operate in parallel.

The instructions 112 may be any set of instructions to be executed directly (such as machine code) or indirectly (such as scripts) by the processor 108. For example, the instructions 112 may be stored as computer code on a non-transitory computer-readable medium. In that regard, the terms "instructions" and "programs" may be used interchangeably herein. The instructions 112 may be stored in object code format for direct processing by the processor 108, or in any other computer language including scripts or collections of independent source code modules that are interpreted on demand or compiled in advance. Functions, methods and routines of the instructions are explained in more detail below (see FIGS. 2-10).

In order to facilitate the operations of the client device 102, the instructions 112 may comprise a browser 116. The browser 116 provides an interface by which the client device 102 may perform a search operation and receive search results, such as, for example, a web browser rendering an Internet search engine landing page. The browser 116 may function to render search results received in response to the search query in a web search results page 118. The browser 116 may also operate to prerender a prerendered page 122 to allow for instant navigation if the user selects a navigation operation associated with the prerendered page 122. The browser 116 may also track metrics 120 associated with the display and navigation operations performed by the browser 116. As described above, any metrics 120 gathered by the browser 116 is maintained in an anonymous fashion with protections in place to maintain user privacy and anonymity. As described above, the browser 116 may be any application suitable for receiving search results and displaying said search results to the user. The browser 116 may maintain multiple sets of content in various instances, such as browser tabs. Prerendering may be performed by rendering the prerendered page 122 in a browser instance that is invisible to the user, and swapping the invisible browser instance to a visible browser instance upon selection of a navigation operation associated with the prerendered page 122.

Data 114 may be retrieved, stored or modified by the processor 108 in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. The data may comprise any information sufficient to identify the relevant information, such as numbers, descriptive text, proprietary codes, references to data stored in other areas of the same memory or different memories (including other network locations) or information that is used by a function to calculate the relevant data.

The data 114 may store the web search results page 118, the metrics 120, and the prerendered page 122 as described above. The web search results page 118 and the prerendered page 122 may be stored as rendered pages in browser instances associated with the browser 116. The metrics 120 may be stored locally and periodically transmitted to the server 104, or calculated and stored on the server 104 directly.

The server 104 may function perform search operations using a search query provided by the client device 102. The server 104 may also embed one or more prerender tags within a search results web page provided to the client device 102. The server 104 may identify candidate links within search results provided to the client device 102 by multiple factors. For example, the server 104 may identify the most relevant link in a set of search results as the best candidate for prerendering. The server 104 may also function to gather metrics, such as the metrics 120 provided by the client device 102 in order to improve prerendering operations. For example, the server 104 may receive metrics regarding the amount of time saved by the user due to prerendering operations, the hit and miss rate for prerendering operations (e.g., how frequently the prerendered search result is selected from the list of search results), or various other features.

The server 104 may be configured similarly to the client device 102, with a processor 124 coupled to a memory 126. The memory 126 may comprise a set of instructions 128 and data 130 to facilitate the operations of the server 104. The instructions 128 may include a search engine 132 and a prerender application 134. The search engine 132 operates to provide search results to the client 102 in response to a search query. For example, the search engine 132 may be an Internet search engine. The prerender application 134 operates to identify search results from search results 132 generated by the search engine 132 as candidates for prerendering. The prerender application 134 includes prerender instructions with the search results 136 to create a set of search results with embedded instructions 138. The search results 136 and search results with embedded instructions 138 may be stored in the data 130. When received by the client device 102, the client device 102 processes the embedded instructions to identify which search results to prerender.

The prerender application 134 may embed the instructions within the search results 136 by adding one or more HTML tags to links associated with the prerender candidate search results. For example, the HTML for a link to an example website example.com may be modified from "<a href="http://www.example.com"> example </a>" to "<link rel="prerender" href="http://www.example.com"/> <a href=http://www.example.com>example</a>" by the prerender application 134 in response to the prerender application 134 detecting that the search result associated with Wikipedia is a good candidate for prerendering.

The client device 102, and the server 104 may each be at separate nodes of a network and be operative to directly and indirectly communicate with other nodes of the network 106. For example, the client device 102 may comprise a mobile phone that is operative to communicate with the server 104 via the network 106.

The network 106, and the intervening nodes between the client device 102 and the server 104 may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers. For example, the functionality of the server 104 may be spread across multiple nodes, with separate nodes hosting the search engine 132 and the prerender application 134.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

Figure 2:
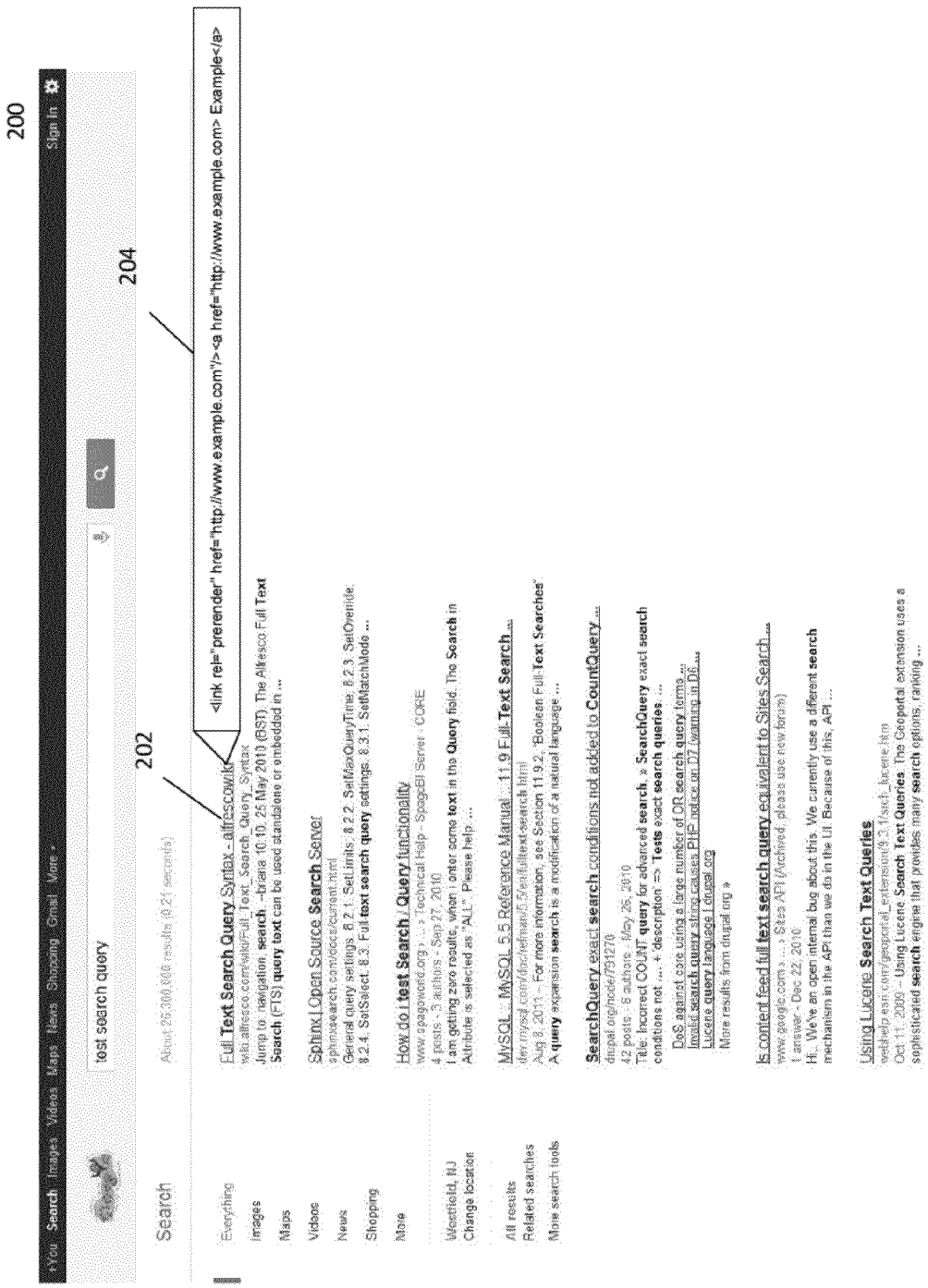
FIG. 2 is an illustration of an example of a search results page using prerendering instructions in accordance with aspects of the disclosure.

FIG. 2 is an illustration of an example of a search results page 200 using prerendering instructions in accordance with aspects of the disclosure. The depicted search results page 200 shows a set of search results received in response to the search query "test search query." Although a plain text query is depicted, a search may be performed via any suitable search query, including a search based on an image, video, or any other source. The search results page 200 includes one or more search results 202. Each search result 202 is associated with HTML data 204. The HTML data 204 for the displayed search result 202, indicates that the search result 202 is embedded with the "link rel='prerender'" term, which indicates that the search result 202 associated with the HTML data 204 should be prerendered by the browser displaying the search results 200.

Figure 3:
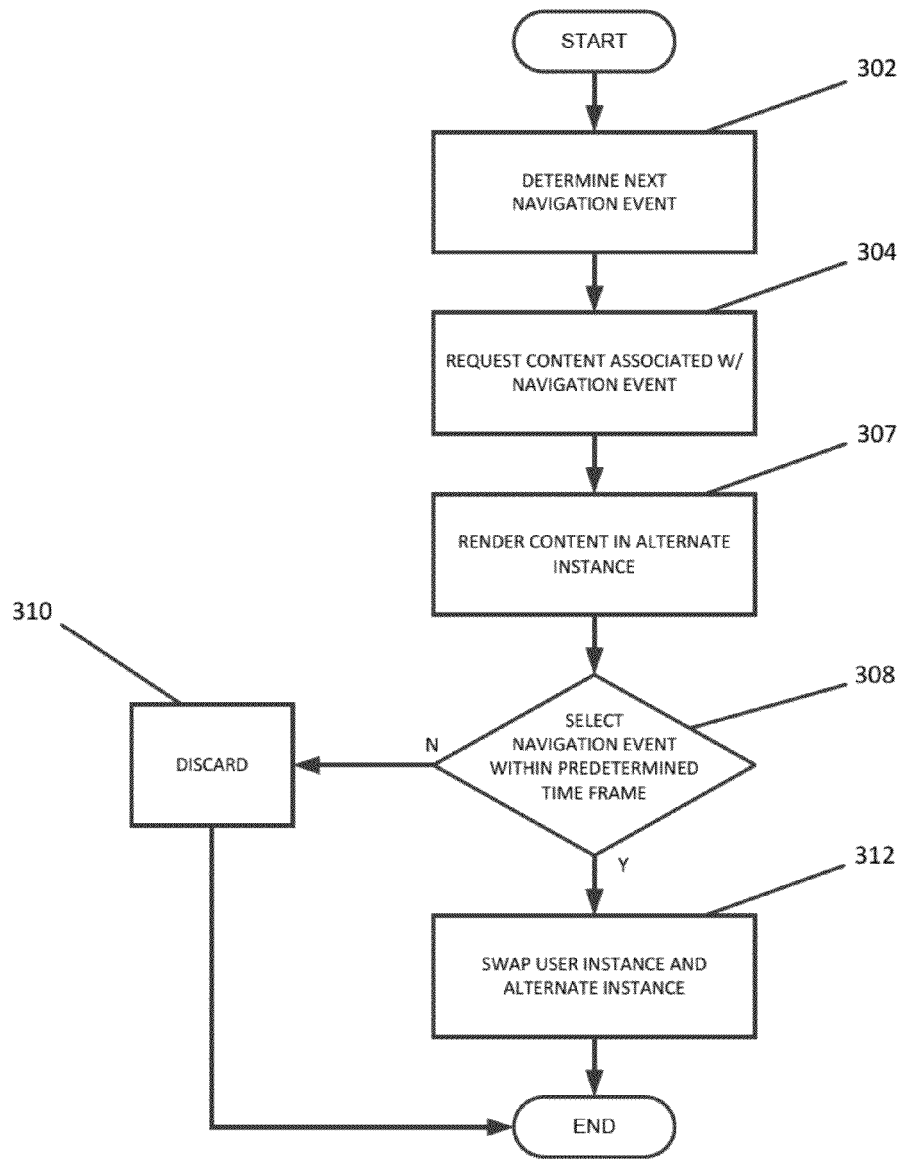
FIG. 3 is a flow diagram depicting an example of a method for prerendering a web page in accordance with aspects of the disclosure.

FIG. 3 is a flow diagram depicting an example method 300 for prerendering a web page in accordance with aspects of the disclosure. Aspects of the method 300 operate to minimize load times for network content by requesting the network content prior to the user navigating to said network content. The method 300 may be performed by a computing device, such as the client 102, to eliminate delays in the user web browsing experience by prerendering web pages that are identified as likely navigation targets by the user. For example, the method 300 may be performed by elements of the browser 116. While aspects of the method 300 are described with respect to the client 102, the method 300 may also be performed by the server 104, or any device with hardware and/or software designed to accept instructions. Example aspects of the method 300 as described relate to prerendering of a single page associated with a single navigation event, but the method 300 is also broadly applicable to prerendering multiple pages associated with one or more navigation events, such as prerendering multiple pages in sequence or in a plurality of parallel prerendering instances.

At stage 302, the client 102 determines a next navigation event within a web browser. The next navigation event may be identified via prerender instructions embedded within a search results page by the server 104. For example, a search engine may embed a tag within a set of search results to indicate that a particular link associated with the most relevant result should be prerendered by the web browser. A method for embedding prerendering tags within a web page is described below (see FIGS. 4 and 8-10).

At stage 304, the client 102 requests the content associated with the navigation event identified at stage 302. The request may comprise a hypertext transfer protocol (HTTP) GET request, a file transfer protocol (FTP) request, or any other network data access request as known in the art. A first set of web content may be provided in response to a HTTP GET request, which may then lead to additional HTTP GET requests in accordance with the first set of web content. For example, a HTTP GET request may result in a base web page being sent to the web browser, which may trigger other page loading operations, such as additional GET requests. The base web page may have multiple embedded images, which are then fetched and rendered using HTTP GET requests for each image. The prerendering process as described may request the full web page, including associated scripts, and then execute those scripts. In response to the request, the web content associated with the navigation event is sent to the web browser. For example, the server 104 may send the content to the web browser. To return to the search engine example, upon receiving a web page with an embedded prerender tag, the client 102 requests and renders the web page associated with the URL associated with the top search result in a hidden browser instance as identified by the search engine.

At stage 306, the client 102 renders content associated with the navigation event determined at stage 302. The content may be rendered in an alternate instance of the web browser that is hidden from the user. For example, the content may be rendered by an alternate process or in a hidden web browser tab. In some aspects, the client 102 may render content associated with multiple navigation events. For example, the navigation events may be associated with a priority value, with higher or lower values associated with more likely navigation events. As such, the client 102 may render the top "n" most likely events, depending upon the capabilities of the client 102 (see FIG. 7).

In some aspects, the rendered content may include a redirection operation. An example of a redirection operation is when the act of loading a first page, for instance, www.a.com, causes the browser to load a second page, such as www.b.com. Redirection may occur in response to a HTML tag, a JAVASCRIPT navigation command, or the like. In the case a prerendered page requests a redirection operation, said redirection operation would also occur in the alternate instance.

In some aspects, a first redirection operation may lead to subsequent redirections. For example, www.a.com may lead to www.b.com, which leads to www.c.com. Aspects of the system and method may account for this fact, such as by storing a history of redirection operations and prerendering the last page in a series in response to a first page being identified to prerender. In some aspects, the method 300 may short-circuit redirection operations by not prerendering intermediate pages when the destination result page (i.e., the page at the end of the redirection operations) is known, and only prerendering the final page in the series.

At stage 308, the client 102 may determine whether the user has selected the link identified at stage 302 within a particular time period. For example, the method 300 may wait for 10 seconds, 20 seconds, 30 seconds, one minute, 5 minutes, or any other time frame. In some aspects, the time frame may be configurable within an options menu associated with the web browser. The time frame may also be specified by the server 104. For example, the server 104 may embed a timeout value within a prerender tag, indicating the length of time the content associated with the tag should be held before being discarded. If the user has selected the link within the time period, the method 300 proceeds to stage 312. Otherwise, the method 300 proceeds to stage 310.

At stage 310, the client 102 discards the prerendered content. The prerendered content is allowed to expire in this manner in order to free up system resources associated with the prerender operation and prevent the user from being presented with stale data. In some aspects, a different expiration period may be specified for different types of data. For example, data that is likely to rapidly change, such as breaking news articles, stock quotes, syndication feeds, and the like, is more likely to grow stale quickly, and might be associated with a shorter expiration timer, such as 10 seconds, 20 seconds, or one minute. Data that is less likely to change, such as reference articles, archives, box scores, and the like, might be associated with a longer expiration timer, such as an hour, 6 hours, 24 hours, a week, or the like. In some aspects, the wait time is based on a page type. For example, if the user is viewing a lengthy news article, a longer wait time may be specified when prerendering a next page of the article to provide the user time to read the current page of the article before selecting the next page. In some aspects, the wait time is determined by a time-to-live (TTL) parameter embedded within the page. In some aspects, the wait time is hard coded within the browser. The method 300 then ends after the prerendered content is discarded, though in some aspects the method 300 may repeat indefinitely as the user browses web content.

At stage 312, the client 102 swaps the alternate instance containing the prerendered content into the current user instance, in response to the user selecting the navigation event determined at stage 302. In this manner, the client 102 displays the content associated with the navigation event instantly, without a delay while the data is requested from and received from the host server. To return to the search results example, if the user selects the most relevant result, the associated page is already loaded in the alternate instance and thus is available instantly as soon as the user clicks the link. In some aspects, the user may select the navigation event prior to the prerendering operation completing. In such cases, the partially loaded page would be swapped into the current user instance. The partially loaded page would then continue to load in the current user instance as normal. The method 300 then ends after making the prerendered content available to the user.

Figure 4:
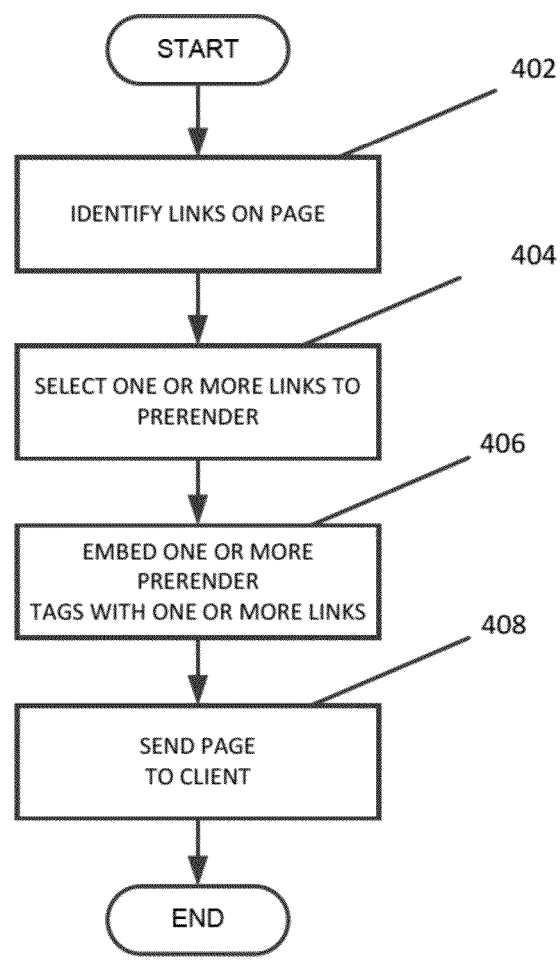
FIG. 4 is a flow diagram depicting an example of a method for indicating a navigation event to prerender in accordance with aspects of the disclosure.

FIG. 4 is a flow diagram depicting an example method 400 for indicating a navigation event to prerender. In some aspects, the server hosting the content, such as the server 104, can specify the navigation event for the web browser to prerender. Allowing the server to specify the prerendered link or links may be optimal for a variety of reasons, such as because the server has the best information on which navigation event is most likely, or because the server wishes to manage bandwidth associated with particular hosted links, such as for load balancing operations. As such, the server 104 may embed a prerender tag or tags within a hosted page, instructing the prerender module 210 of the client 102 in which content to render.

At stage 402, the server 104 identifies one or more links within a hosted web page. For example, the server 104 may generate a list of web sites in response to a query from the client 102. Each search result may be associated with a particular link on the page that is to be provided in response to the query.

At stage 404, the server 104 selects one or more links to prerender, chosen from the links identified at stage 402. The links to prerender may be chosen by a variety of methods for a variety of purposes, such as by examining a user navigation history, an aggregate navigation history, a most relevant link, and the like. In some aspects, the links are chosen by a search engine analyzing the links most frequently clicked in response to a particular query. For example, the search engine may collect "click-through" data indicating which links are clicked on in response to a particular query, and select one or more links to prerender based upon the frequency with which the particular links are selected. To continue the search engine example, the server 104 might identify the top search result, or the top "n" search results as optimal links to prerender. In some aspects, the server 104 may further identify a ranking of links to prerender, with the most optimal link to prerender being ranked number 1, the next most optimal link being ranked number 2, and so on. The server 104 may also identify a likelihood that each link will be selected, rather than a rank. For example, the server 104 may indicate that a particular link has a 50% likelihood, a 25% likelihood, or a 80% likelihood of being selected by a user. Prerender operations performed by the client may elect to prerender links associated with a threshold level of likelihood, for example, such as at least 50% likelihood, at least 80% likelihood, or any other threshold value.

At stage 406, the server 104 embeds one or more prerender tags with the one or more links identified at stage 404. For example, the server 104 may include a hypertext markup language (HTML) tag for identifying the optimal link or links to prerender. As described above, the prerender tag may also include a ranking value and a TTL value specifying a time to keep the prerender. To continue the search engine example, the server 104 may identify each search result with a prerender tag, along with ranking the prerender order of the results by the relevance of the search result.

At stage 408, the page with the embedded prerender tags is sent to the client that requested the page. The method 400 then ends after sending the page.

Figure 5:
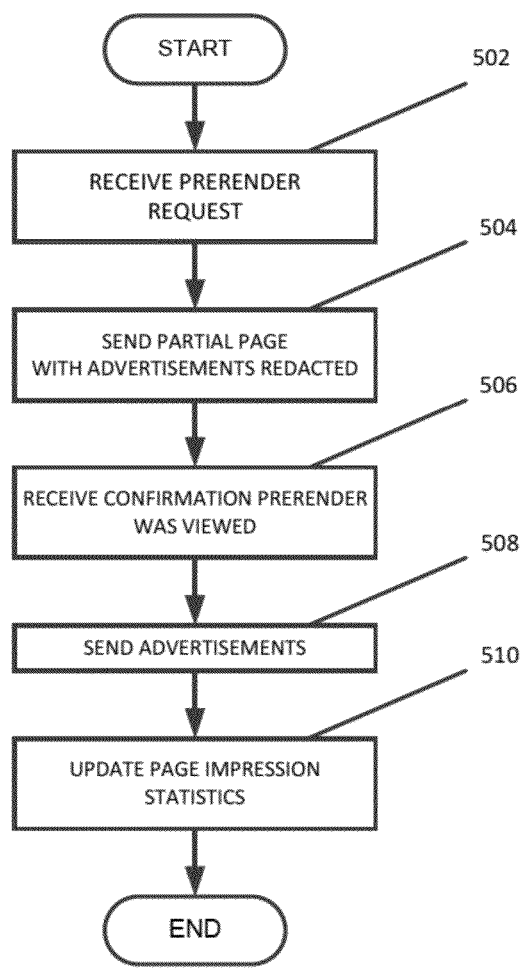
FIG. 5 is a flow diagram depicting an example of a method for managing web impression statistics during a prerender operation in accordance with aspects of the disclosure.

FIG. 5 is a flow diagram depicting an example method 500 for managing web impression statistics during a prerender operation in accordance with aspects of the disclosure. Web sites often track what content is viewed, which pages are accessed, in what order those pages are accessed, and how much time is spent on each page. These capture and analysis of such data is broadly referred to as "website analytics". These statistics provide data that may be used by site operators for a variety of purposes. For example, one such use of this data is to calculate rates for advertisements displayed along with the content. However, in some instances, the user may not select the navigation event associated with prerendered content, thus possible interfering with collection of this data. For example, the traditional model of tracking user impressions via the number of times a given page is sent to the user may no longer provide accurate results, because the user may not view the content every time it is sent. As such, the server, such as the server 104, may provide a method for accurate tracking of impressions that takes into account prerendered content. One such method is described below. Although specific examples of the method may be provided with respect to managing impression statistics of advertisement content, it should be appreciated that aspects of the method are broadly applicable to ensuring accurate website analytics for pages served in response to prerender requests.

At stage 502, the server 104 receives a prerender request from a computing device, such as the client 102. In some aspects, the prerender request may be identified using a scripting application programming interface (API), such as by the client 102 indicating the content request is for a prerender operation via a JAVASCRIPT API transmitted with the content request. The prerender request may also be accompanied by a modified HTTP header, indicating that the request is a prerender request. In some aspects, the server 104 is configured to receive an event notification from the client 102 as provided by the API, such as by registering for the event notification using an application executing on the server 104. In some aspects, the server 104 may elect to not send content in response to a prerender request, such as in instances where the server is bandwidth constrained, or otherwise does not wish to allow prerendering. Providing notification of the prerender request in this manner also allows for the server 104 to "opt-out" of processing the prerender request. For example, the server 104 may be bandwidth constrained and thus need to focus on hosting non-prerendered content. In some aspects, the server 104 may also opt-out by including a HTML metatag indicating as such, or an entry in a "robots.txt" file hosted on the server to prevent prerendering of content by a search engine, such as indicated in a list of search results.

At stage 504, the server 104 may send a partial web page, with the certain content redacted. For example, the server 104 may not provide images associated with advertisement content in response to a prerender request, as in many instances advertisement impressions are determined based upon the number of times the advertisement image is sent. A similar method may apply to advertisements provided in other manners, such as via scripting or executable content. As an example, the server 104 might respond to a prerender request by providing a base web page. The base web page may result in the client 102 initiating one or more additional HTTP GET requests for content identified by the base web page. The server 104 may opt not to send content in response to HTTP GET requests for ad images identified within the base web page.

In some aspects, the redacted version of the content may include a special HTTP error code associated with redacted images, scripts, and the like, indicating to the receiving computing device that certain content has been redacted. In this manner, the client 102 may be informed that certain content has been redacted and will be supplied later, rather than that the content is unavailable. As such, the client 102 may opt to indicate redacted content with a particular graphic or temporary display while the content loads upon access, or the redacted content may appear blank.

In some cases, the client 102 may not be aware of how to properly display redacted content, in which case the client 102 may abort the prerender operation. Furthermore, when the user accesses the content, the client 102 may notify the server 104 that the prerendered page has been viewed. In response, the server 104 may send the redacted content to the client 102.

At stage 506, the server 104 receives confirmation that the prerender of the content was viewed by the user. As above, the server 104 may be notified of the viewing of the content via an API provided through the web browser. For example, a script may communicate an event notification to the server 104. If the server 104 is registered for such an event notification, it may take appropriate action, such as sending the redacted content to the client 102. By informing the server 104 that the prerender content was viewed, the server 104 knows to send any redacted content and update the impression statistics associated with any advertisements.

At stage 508, the server 104 sends the content that was redacted at stage 504. The content can now be sent because the server 104 has ensured that the user has accessed the content. For example, the server 104 may send images associated with advertisements, scripting code, or the like.

At stage 510, the server 104 updates the impression statistics associated with the content as sent at stage 508. In some aspects, stages 508 and 510 occur simultaneously as the act of hosting the image/sending an advertisement automatically updates the page impression statistics. In this manner the server 104 maintains accurate reporting of website analytics data while also allowing the client 102 to perform prerender operations.

Figure 6:
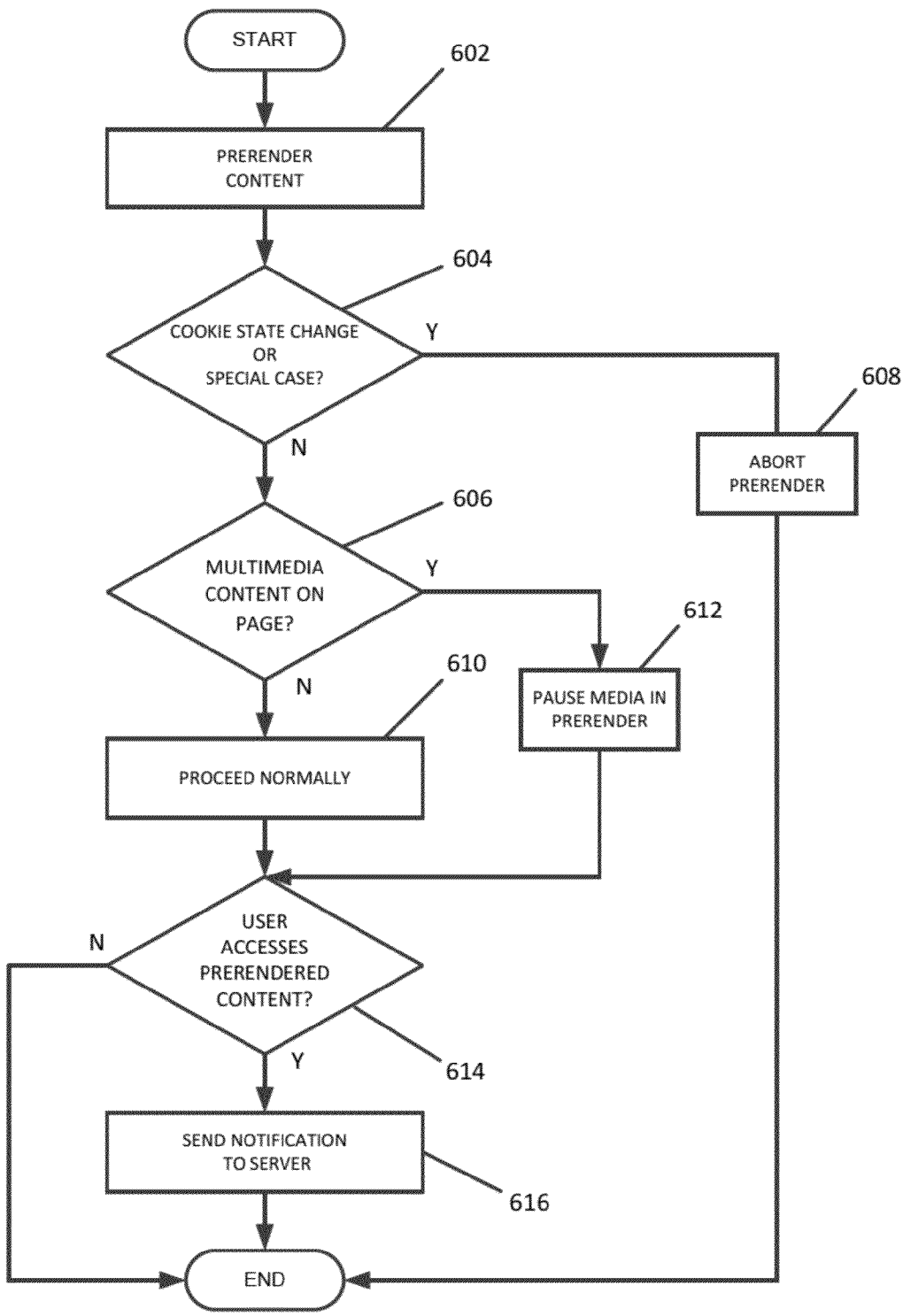
FIG. 6 is a flow diagram depicting an example of a method for managing a prerender operation in accordance with aspects of the disclosure.

FIG. 6 is a flow diagram depicting an example method 600 for managing a prerender operation in accordance with aspects of the disclosure. In order to provide an optimal prerendering experience, the client 102 can account for different factors that may affect the browsing experience. For example, web pages commonly use small files known as cookies to provide various page services via the web browser. For example, a news site may employ a tracking cookie to allow a user to access one news article per day without registering on the page. A prerender operation associated with that news site could then interfere with the user's browsing experience, as the user may prerender an article he does not intend to read, thus using up the one free article per day on a page he has not viewed.

Some web pages have embedded audio or video content that begins to play as soon as the page loads. In some implementations, the prerender method and system as described herein can allow such content to begin playing before the user navigates to the content, thus when the user begins viewing the page, the content is already playing. Some web pages may include additional content that might not be suitable for prerendering, such as pop-up pages, scripted programs, downloads, authentication prompts, translation bars, and the like. As such, the prerender module 210 may employ a method, such as the method 600, for managing these special cases.

At stage 602, the client 102 requests and receives prerender content from a server, such as the server 104. As described above, the request may be presented in or accompanied by an API call, indicating to the server that the request is a prerender request. The page is prerendered based on a response received from the server. During the prerendering process, the client 102 monitors for several particular cases as described below. Although presented in a particular order, these cases could be encountered in any order, such as by identifying an embedded video prior to experiencing a cookie state change, for example.

At stage 604, the client 102 determines whether the requested prerender content includes a cookie state change or another special case. For example, if a user is accessing a banking web page, if an account page is prerendered and then the user logs out of their account, selecting the prerender link would incorrectly report data as if the user was still logged in. As such, the prerender would be invalid as soon as the user has logged out. The client 102 therefore monitors the state of any cookies associated with prerender content and may take appropriate action. Appropriate action may include attempting to properly propagate cookie state changes, ignoring cookie state changes and continuing with the prerender operation, or giving up and aborting the prerender operation. The client 102 further determines if the prerender content includes a special case, such as a pop-up page, a scripted application, a download, an authentication menu, or a translation bar. If a cookie state change has occurred or the prerender page includes a special case, the method proceeds to stage 608. Otherwise the method 600 continues to stage 606.

At stage 608, the client 102 may abort the prerender operation. The client 102 may abort the prerender operation because the cookie state change or special case identified at stage 604 makes the data associated with the prerendered page stale or otherwise unviewable to the user. In some aspects, the client 102 may ignore the cookie state change. The method 600 then ends.

As an alternate method of managing cookie data, the client 102 may track any cookie state change associated with the prerendered content, and apply the state change when the prerendered content is accessed by the user. In some aspects, the client 102 may also monitor for conflicts in cookie state change, and abort the prerendering operation in the event of a conflict. For example, a cookie state change may occur after the prerender operation is complete, thus causing a conflict. In such a case, the prerendered version of the page could be discarded to avoid presenting incorrect page data to the user.

At stage 606, if the prerender content does not contain a special case and has not had a cookie state change, the client 102 determines whether there is multimedia content on the page, such as audio or video. For example, the page may include an embedded video programmed with ADOBE FLASH, HTML5 media, or another type of embedded media. In such a situation, it may be desirable to pause the multimedia until the user actually navigates to the page, thus saving bandwidth and ensuring the user may view the entire multimedia file. If the page contains embedded multimedia, the method 600 proceeds to stage 612. Otherwise the method 600 proceeds to stage 610.

At stage 610, the client 102 has determined that the content contains no multimedia content, cookie state changes, or special cases, and thus the client 102 prerenders the page. The prerendering process may be performed by receiving the page from the server 104, and rendering the page in an application instance that is hidden from the user. Rendering the page generally relates to loading all of the data received from the server 104, and executing any instructions contained therein, as they would otherwise be executed when viewing the page in a non-hidden application instance.

At stage 612, the client 102 has determined that the content contains multimedia content. Thus the client 102 prerenders the content of the page other than the multimedia content, and may pause playback of the multimedia content, or defer the instantiation of a plug-in associated with the content. For example, the client 102 might pause an embedded audio or video file after prerendering the rest of the page, or a FLASH video might not execute until the prerender content is shown to the user.

At stage 614, the client 102 determines whether the user has accessed the prerendered content. If the user accesses the prerendered content, the content is displayed as described above, and the method 600 proceeds to stage 616. If the user does not access the prerendered content, for example, if a prerender timer expires as described above with respect to FIG. 3, then the method 600 ends.

At stage 616, the client 102 sends notification that the user accessed the prerender to the server 104. As described above, the notification may be sent using a scripted API from which the server is configured to receive event notifications. Providing notification in this manner allows for the management of website impressions by the server (see FIG. 5).

Figure 7:
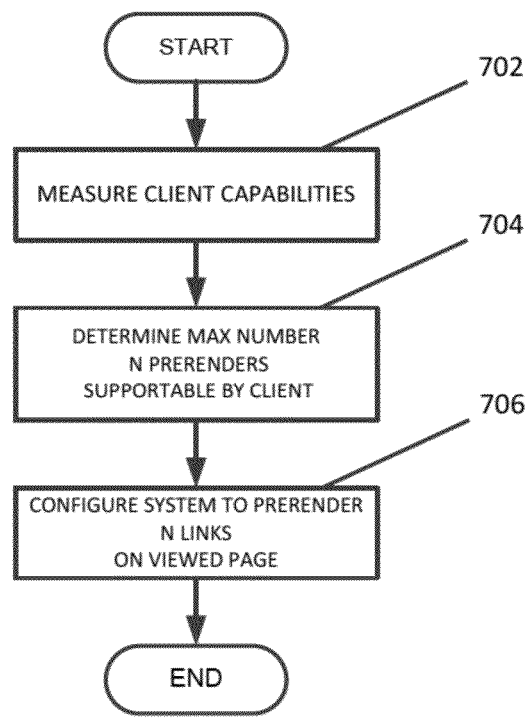
FIG. 7 is a flow diagram depicting an example of a method for configuring a prerender operation in accordance with aspects of the disclosure.

FIG. 7 is a flow diagram depicting an example method 700 for configuring a prerender operation in accordance with aspects of the disclosure. Different computing devices may possess different capabilities, such as network bandwidth, system memory, and processor speed. As such, various devices may be able to support different prerender operations. A device with more capability may be able to support multiple prerender operations, or the prerendering of more complicated pages. As such, the method 700 provides for configuration of these prerender operations based upon the capabilities of the system.

At stage 702, the client 102 conducts a measurement of system capabilities. For example, the client 102 may query the operating system for the amount of free system memory, the client 102 may request the processor speed from the basic input-output system (BIOS), or the client 102 may conduct a network speed test to determine free bandwidth.

At stage 704, the client 102 determines a maximum number "n" prerenders based upon the capabilities as determined at stage 702. In some aspects, the client 102 may determine a set of system requirements to support a single prerender instance. For example, a single prerender instance may require 10 percent processor utilization, 16 megabytes of system memory, at least 10 kilobytes/second of network bandwidth, or the like. The system requirements may also include multiple capabilities associated with different system components, such as each of a minimum memory requirement, a processor utilization, and a network bandwidth. These system requirements may be determined by measuring the system utilization of a single prerender instance executing on the client 102.

For example, the client 102 may determine that each prerender operation is likely to require the system processor while prerendering. Such processor use may be "bursty" in that the entire processor is needed when the page is first loading, with reduced processor need thereafter. In such cases, the client 102 may assign a lower processor priority to the prerender instance to ensure that prerendering of a page does not impact the user's browsing experience. In some aspects, the client 102 may monitor a system memory to determine a number of prerender instances. The client 102 may determine an amount of memory used by a prerender instance and then compare this amount to the total available memory capacity. In some aspects, the client 102 may reserve a particular amount of system memory for prerendering, and generate prerender instances until the reserved memory is filled. In some aspects, a maximum network bandwidth of the system is determined, and prerender instances are generated based on the percentage of available bandwidth. In some aspects, the client 102 may request a bandwidth measurement from a remote server to identify a local maximum bandwidth, and use the measurement to determine a prerender setting.

At stage 706, the client 102 is configured to perform as many simultaneous prerenders as the system capabilities can support, as determined at stage 704. In some instances, the number of prerenders may be configurable by the user, such as in an options menu.

Figure 8:
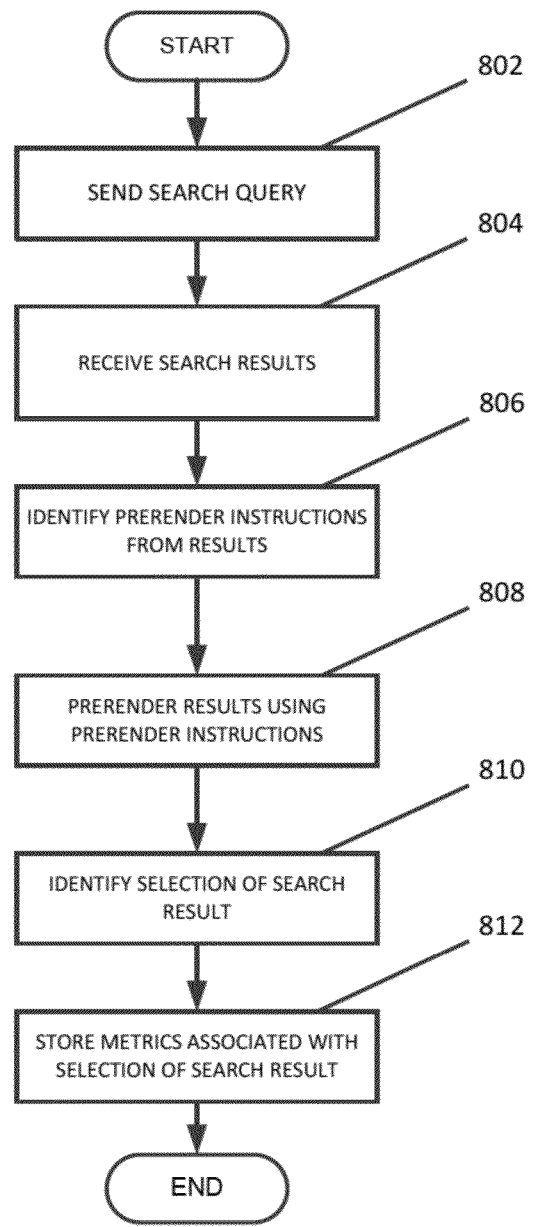
FIG. 8 is a flow diagram depicting an example of a method for processing prerender instructions embedded within a search results page in accordance with aspects of the disclosure.

FIG. 8 is a flow diagram depicting an example of a method 800 for processing prerender instructions embedded within a search results page in accordance with aspects of the disclosure. As described above, the server 104 may embed prerender instructions within a search result page for processing by the client 102. The client 102 may identify the prerender instructions embedded in the search result page to choose links for prerendering.

At stage 802, a search query is sent to the server 104. As described above, the search query may be a text string, a file, an image, a video, or any other method of identifying content with the expectation of receiving search results.

At stage 804, search results are received. The search results are responsive to the search query sent at stage 802. The search results may be presented to the user as a series of text links sorted by relevancy, such as described above (see FIG. 2).

At stage 806, prerender instructions are identified for association with the search results received at stage 804. For example, the prerender instructions may be included in HTML tags associated with each result, or the prerender instructions may be transmitted to the client 102 by other means, such as by AJAX or another messaging protocol. For example, prerender tags may be dynamically inserted by the client into HTML tags on the search result page based on prerender instructions received by the messaging protocol. The prerender instructions may identify multiple links as prerender candidates. In the event multiple prerender candidates are identified, the prerender instructions may further indentify a ranking of the prerender candidates, such that the results with the highest ranking are to be prerendered by the client. The client 102 may identify a particular number "n" links to prerender based on the prerender instructions and available system resources of the client (see FIG. 7). At stage 808, the pages associated with the prerender instructions identified at stage 806 are prerendered. The client 102 may be aware of other data when determining whether to perform prerendering. For example, the client 102 may be aware that the user has selected a link and then pressed the "back" button in the web browser. As such, it is unlikely the user will select the same result they just left. Therefore, the client 102 may instead prerender the next most likely prerender candidate search result instead of the search result that the client 102 just left.

At stage 810, a selection operation is performed on one of the search results. The selection operation does not necessarily need to be on a link prerendered by the client 102. For example, the user may select a link other than the link identified by the prerender instructions. The user may wish to select a non-prerendered link for a variety of reasons, as the results provided in response to a search query may relate to a variety of subject matter, and the user may not always wish to view the most commonly selected search result.

At stage 812, metrics are stored relating to the selection of the search result. These metrics allow for the browser to track data identifying the accuracy of the prerender operation. For example, in an optimal circumstance, the user always selects the link associated with the prerender instruction. By collecting metrics associated with whether the user selected a prerendered link, the system may determine whether the criteria for prerendering are appropriate in that they maximize selection of prerendered content while minimizing prerendering where the user is not likely to select the prerendered content. Mispredicted prerender operations may result in content being requested but not accessed. This results in wasted bandwidth and processing power. However, in order to maximize the benefit to the user and provide a consistent user experience, prerendering may be used on as many search results as practical. The stored metrics may be transmitted to the server 104 for analysis and processing, or the metrics may be stored on the local client and periodically uploaded. Metric data stored in this manner is anonymized to remove personal user data before upload. A method for capturing metrics associated with prerender operations is described further below (see FIG. 10).

Figure 9:
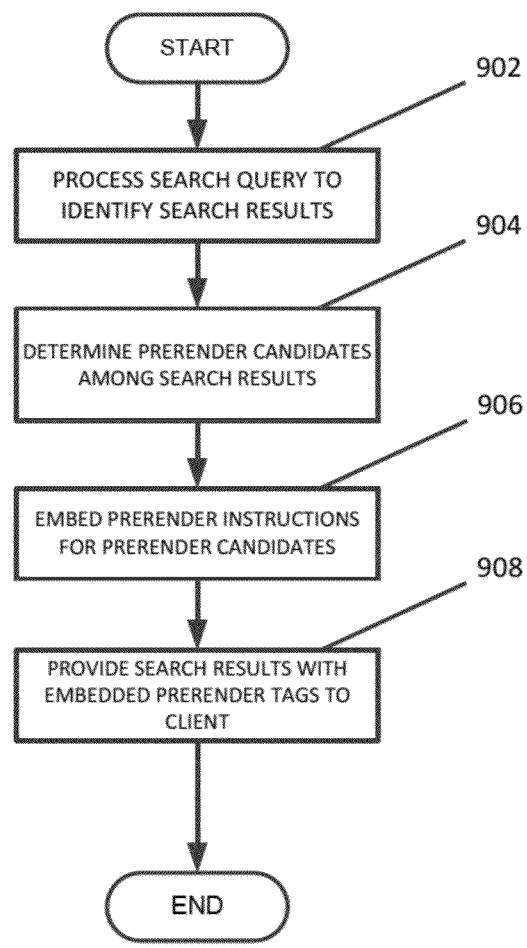
FIG. 9 is a flow diagram depicting an example of a method for embedding prerender instructions within a search results page in accordance with aspects of the disclosure.

FIG. 9 is a flow diagram depicting an example of a method 900 for embedding prerender instructions within a search results page in accordance with aspects of the disclosure. The method 900 operates to include one or more sets of prerender instructions in a set of search results provided by a search engine, such as on the server 104. Search results that are likely to be selected by the user are identified from a set of search results using a variety of factors, and indicated as likely prerender candidates using prerender instructions. These search results may be provided to a client along with the prerender instructions in response to a search query received from the client.

At stage 902, a search query is received. The search query may include any criteria sufficient to institute a search operation, such as a text string, image, or video. The search engine may identify one or more results that are relevant to the search query. These results may include hyperlinks to pages containing relevant content, a brief description of the contents of the linked pages, or any other data commonly provided in response to a search query.

At stage 904, prerender candidates are determined among the search results. Prerender candidates may be determined based on the relevance of each result to the search query (e.g., a more relevant result is more likely to be a prerender candidate), based on statistical data of which link users typically select in response to the query, or via other criteria. The search engine may also identify links as prerender candidates based on web analytics data such as the amount of traffic going to the search result, whether the host of the search result has opted out of prerendering, or the amount of content associated with the search result (e.g., a file size of the search result page or the amount of data stored on the search result page and linked content). The amount of traffic that the search result is experiencing may be determined based on the number of users selecting the search result when provided the search result by the search engine. In some aspects, the server may be aware of the network connection speed of the client, and indicate an appropriate number of links to prerender based on the client connection speed.

The prerender candidates may be determined using one or more factors or signals. These may include, but are not limited to, relevancy to the search query, frequency of selection by the user when included as a prerender candidate, the amount of traffic associated with the search result, the location of the user, the user's connection speed, whether the search result has opted out of the prerender process, and the size of the web page associated with the search result. These factors or signals may be assigned weights and used to generate a score, where the results associated with the highest scores are identified as prerender candidates and associated with prerender instructions. All search results with a score higher than a particular threshold may be identified as prerender candidates, or only a set number of search results may be identified as prerender candidates.

At stage 906, the prerender instructions are embedded within the search results page such as, for example, adding a prerender HTML tag to the appropriate search results. At stage 908, these results with embedded prerender instructions are provided to the client 102.

Figure 10:
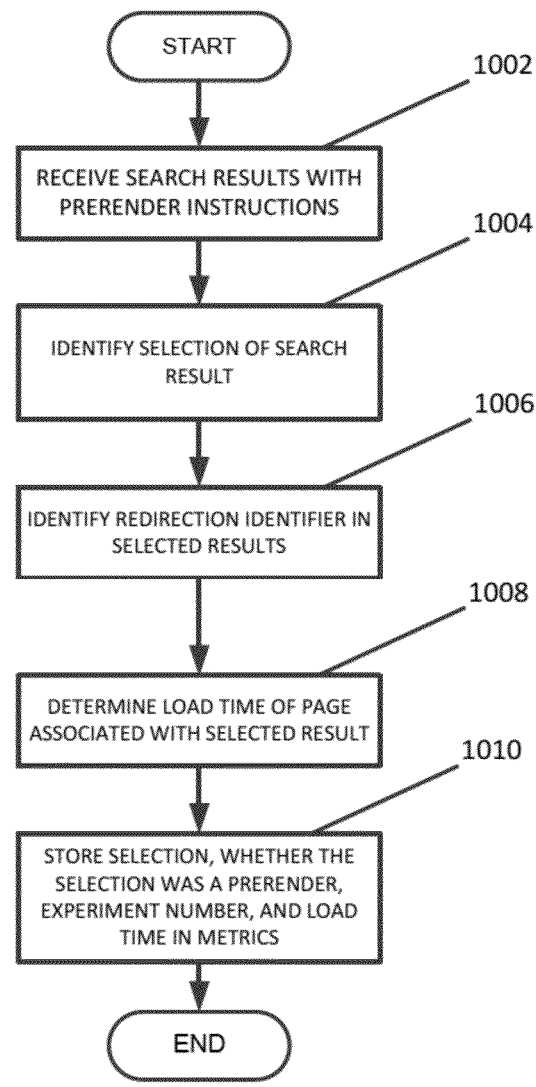
FIG. 10 is a flow diagram depicting an example of a method for obtaining prerender metrics in accordance with aspects of the disclosure.

FIG. 10 is a flow diagram depicting an example of a method 1000 for obtaining prerender metrics in accordance with aspects of the disclosure. Obtaining metrics for prerendering operations allows the controllers of the server 104 to manage how links are identified as prerender candidates to ensure maximum accuracy while minimizing "false positives" where a link is prerendered but not selected. In order to collect accurate data to calibrate prerendering performance, data may be provided by clients that opt-in to the data gathering process. As with all captured user data, appropriate precautions are taken to anonymize and remove any personal user data from the captured metrics. Users that submit metric data may be divided into two groups, a "control" group that receives prerender tags but does not actually prerender them, and a "test" group that actually performs the prerender operations.

Mispredicted selections result in wasted system resources for the page hosting the search result and for the client performing the prerendering. However, coverage should also be high enough to provide a consistent user benefit and an optimal user experience. The browser may be aware when a prerendered page is swapped into a visible browser instance, so it is possible to record the time between when the swap-in occurred and the time when the page is fully loaded. This value indicates how much time was saved by the prerender operation.

The control group provides a baseline to track the amount of time between the selection of a search result and the display of the selected result in the browser. This result may be compared against the amount of time it takes for a prerendered page to be displayed in the browser to determine the overall benefit to users performing the prerendering operation. By determining the amount of time saved by enabling prerendering operations for various links, links that save an optimal amount of time may be selected for prerendering. Links that frequently generate a "false positive" or otherwise sub-optimal prerender performance may be specifically identified as bad candidates for prerendering. In this manner, the method 1000 provides metrics that may be used to fine-tune the prerendering operation to ensure maximum accuracy and coverage.

At stage 1002, the client 102 receives a set of search results along with a set of prerender instructions associated with those search results. If the client 102 is a "test" client, then the search results associated with the prerender instructions may be prerendered in a hidden browser instance. If the client is a "control" client, then the search results may not be prerendered. The "test" clients may further be divided into sub-groups. For example, each of the test clients may be included in a sub-group numbered 1 through 9. These sub-groups may employ different prerender techniques (e.g., different search result selection methods, different thresholds for prerendering) to determine performance benefits associated with each prerender technique. A particular test identifier may be specified to the client in an address of the search results page, such as by appending a "link prerender experiment" (LPE) term to the address of the search results page. The LPE term may be associated with a value, such as 1 through 9, for the particular prerender experiment with which the provided search results are associated. The client may track the LPE term when storing metrics to improve the prerender process.

At stage 1004, user interactions with the client are monitored for a selection of a particular search result, such as via a mouse click, touch screen event, or keyboard press on a particular result.

At stage 1006, any redirection identifiers associated with the selected result are identified. Search engines frequently use redirection when displaying search results; a hyperlink in a search results page may link to a search engine redirect page, which points to the actual content being prerendered. When a page with a redirection operation is selected using a "control" client, the method may identify the redirection page as the result instead of the result to which the redirection page redirects. The target address of the redirection page may be specified within the prerender instructions to ensure that the metrics properly relate to the load time of the actual destination page, rather than the redirection page. In this manner, the client can "know" when such a redirection happens on a search result page, and thus maintain a record for the address in the search result that "would" have been prerendered, and thus correctly record the page load time of the actual destination page.

Where the test clients are separated into sub-groups for experimental purposes, redirection identifiers may be utilized to track the results of the experiment. For example, a set of search results may be associated with a given set of prerender instructions and a given test identifier (e.g., specifying a particular algorithm for choosing links to prerender). When the user selects one of the presented links, the redirection link associated with the selected link may indicate the experiment sub-group (e.g., 1 through 9), the selected link, the search query, and whether the selected link was prerendered.

At stage 1008, the load time of the selected result page is measured. This load time relates to the time from when the user selects the search result to the time the search result is fully loaded in the browser. In a "control" client, this load time includes the acts of requesting the content associated with the search result over the network from a server hosting the content, and rendering that content in the browser. In the "test" client, the load time includes the time it takes to request any content not received during the prerender operation, and display that content in the browser. Typically, the load time associated with a "test" client should be less than the time associated with a "control" client, since the "test" client gets a head start on the network content request part of the transaction. Comparison of the load time for "test" clients and "control" clients gives abroad picture of how much time is saved for users by prerendering.

At stage 1010, the search result selection, whether the search result selection was prerendered, the LPE number, and the load time of the search result selection are stored as metrics. These metrics may provide data that indicates the accuracy of prerender instructions (e.g., whether the prerendered search result was selected) and the amount of time saved by the prerender operations (e.g., the difference between load times in the "control" clients and "test" clients). The metrics may be uploaded to the server 104 immediately for analysis or stored on the client 102 for upload to the server 104 periodically. The server 104 may perform automatic processing on the metrics to identify particular results to prerender, such as removing prerender instructions from search results that have a low prerender accuracy.

The stages of the illustrated methods are not intended to be limiting. The functionality of the methods can exist in a fewer or greater number of stages than what is shown and, even with the depicted methods, the particular order of events may be different from what is shown in the figures.

The systems and methods described herein advantageously provide for an improved method and system for prerendering of search result pages. By embedding prerender instructions within search result pages, the user experience may be improved by reducing wait times for search results the user is likely to select. A search engine is well-suited for providing prerender instructions in this manner, as it may take into account variables such as site traffic, result relevance, the particular search query, historical navigation data, and other metrics to provide prerender instructions that maximize coverage and accuracy and minimize false positives and wasted bandwidth. The search engine may also communicate with client devices that gather metrics used for improving the prerender experience.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g:", "including" and the like) should not be interpreted as limiting the disclosure to the specific examples; rather, the examples are intended to illustrate only some of many possible embodiments.

The invention claimed is:

1. A computer-implemented method for prerendering using a search result page, the method comprising:
    determining, using a processor, at least one search result responsive to a search query;
    generating a search result page comprising the at least one search result;
    identifying at least one prerender candidate among the at least one search result, the at least one prerender candidate indicating a search result that is likely to be selected, wherein the at least one prerender candidate is identified using an indication, the indication comprising at least one of: an amount of traffic flowing from the search engine to the search result, a location of a client device that provided the search query, or a size of one or more resources associated with the search result;
    embedding prerender instructions for the at least one prerender candidate in the search result page, the prerender instructions include instructions for loading the prerender candidate into a hidden browser instance; and
    providing the search result page to a client device that provided the search query.

2. The method of claim 1, wherein the prerender instructions are embedded within a hypertext markup language tag associated with the at least one search result.

3. The method of claim 1, wherein the prerender instructions are provided to the client device via client side scripting.

4. The method of claim 1, further comprising:
    receiving metrics from the client device indicating whether the prerender candidate was selected when displayed; and
    using the metrics to identify future prerender candidates in response to subsequent search queries.

5. The method of claim 4, wherein the metrics are at least one of whether a selected link was prerendered or a load time of the selected link.

6. The method of claim 1, further comprising:
    embedding an experiment identifier in the search result page, the experiment identifier corresponding to a particular method used to identify the at least one prerender candidate; and
    using one or more redirection operations associated with the search result page to identify the experiment identifier associated with a selection operation and whether the at least one prerender candidate was selected.

7. A computer-implemented method for prerendering using a search result page, the method comprising:
    sending a search query to a search engine;
    receiving a set of search results responsive to the search query, the set of search results comprising at least one prerender instruction indicating at least one of the search results is a candidate for prerendering;
    identifying the at least one prerender instruction, wherein the at least one prerender instruction is identified using an indication, the indication comprising at least one of: an amount of traffic flowing from the search engine to the at least one search result, a location of a client device that provided the search query, or a size of one or more resources associated with the at least one search result; and
    prerendering the at least one search result associated with the at least one prerender instruction for loading the search result into a hidden browser instance.

8. The method of claim 7, further comprising:
    monitoring for a selection operation performed on a selected search result from the set of search results; and
    swapping the at least one search result into an active browser instance if the selected search result is the at least one search result.

9. The method of claim 7, further comprising:
    storing metrics associated with a selection of a selected search result from the set of search result; and
    transmitting the metrics to provide statistical data to improve selection of prerendering candidates in response to subsequent search queries.

10. The method of claim 9, wherein the metrics are at least one of the selected search result, whether the selected search result is the at least one search result, and a page load time to access the selected search result.

11. The method of claim 7, further comprising:
    executing the prerender instruction to insert a prerender tag into a hyperlink associated with at least one search result.

12. The method of claim 9, wherein the metrics further comprise an experiment identifier embedded in the set of search results, the experiment identifier indicating a methodology for choosing the at least one of the search results as a candidate for prerendering.

13. A non-transitory computer readable storage medium comprising instructions that, when executed by a processor, perform a method comprising:
    sending a search query to a search engine;
    receiving a set of search results responsive to the search query, the set of search results comprising at least one prerender instruction indicating at least one of the search results is a candidate for prerendering;
    identifying the at least one prerender instruction, wherein the at least one prerender instruction is identified using an indication, the indication comprising at least one of: an amount of traffic flowing from the search engine to the at least one search result, a location of a client device that provided the search query, or a size of one or more resources associated with the at least one search result; and prerendering the at least one search result associated with the at least one prerender instruction for loading the search result into a hidden browser instance.

14. The non-transitory computer readable medium of claim 13, wherein the instructions further comprise:
monitoring for a selection operation performed on a selected search result from the set of search results; and
swapping the at least one search result into an active browser instance if the selected search result is the at least one search result.

15. The non-transitory computer readable medium of claim 13, wherein the instructions further comprise:
storing metrics associated with a selection of a selected search result from the set of search result; and
transmitting the metrics to provide statistical data to improve selection of prerendering candidates in response to subsequent search queries.

16. The non-transitory computer readable medium of claim 13, wherein the metrics are at least one of the selected search result, whether the selected search result is the at least one search result, and a page load time to access the selected search result.

17. The non-transitory computer readable medium of claim 13, wherein the metrics further comprise an experiment identifier embedded in the set of search results, the experiment identifier indicating a methodology for choosing the at least one of the search results as a candidate for prerendering.

18. A processing system for prerendering using a search result page, the processing system comprising:
a memory coupled to at least one processor; and
the at least one processor configured to:
determine at least one search result responsive to a search query;
generate the search result page, the search result page comprising the at least one search result;
identify at least one prerender candidate among the at least one search result, the at least one prerender candidate indicating a search result that is likely to be selected, wherein the at least one prerender candidate is identified using an indication, the indication comprising at least one of: an amount of traffic flowing from the search engine to the search result, a location of a client device that provided the search query, or a size of one or more resources associated with the search result;
embed prerender instructions for the at least one prerender candidate in the search result page, the prerender instructions include instructions for loading the prerender candidate into a hidden browser instance; and
provide the search result page to a client device that provided the search query.

19. The processing system of claim 18, wherein the prerender instructions are embedded within a hypertext markup language tag associated with the at least one search result.

20. The processing system of claim 18, wherein the prerender instructions are provided to the client device via client side scripting.

21. The processing system of claim 18, wherein the processor is further configured to:
receive metrics from the client device indicating whether the prerender candidate was selected when displayed; and
use the metrics to identify future prerender candidates in response to subsequent search queries.

22. The processing system of claim 21, wherein the metrics are at least one of whether a selected link was prerendered or a load time of the selected link.

23. The processing system of claim 18, wherein the processor is further configured to:
embed an experiment identifier in the search result page, the experiment identifier corresponding to a particular method used to identify the at least one prerender candidate; and
use one or more redirection operations associated with the search result page to identify the experiment identifier associated with a selection operation and whether the at least one prerender candidate was selected.

* * * * *